UNITED STATES PATENT OFFICE.

BERNHARD JACQUES FLÜRSCHEIM, OF FLEET, ENGLAND.

NITRO DERIVATIVE OF ANILIN AND PROCESS FOR THE MANUFACTURE OF SAME.

1,045,011. Specification of Letters Patent. Patented Nov. 19, 1912.

No Drawing. Application filed February 4, 1911. Serial No. 606,588.

*To all whom it may concern:*

Be it known that I, BERNHARD JACQUES FLÜRSCHEIM, doctor of philosophy and research chemist, by birth a German subject, but having applied for naturalization as a British subject, and a resident of Fleet, Hampshire, England, have invented a new and useful Nitro Derivative of Anilin and Process for the Manufacture of Same, of which the following is a specification.

Among the derivatives of anilin, which are unsubstituted in the amino group, trinitro-anilin has hitherto been the richest in nitro groups.

I have discovered, that a tetra-nitro-anilin may be obtained, if one of the following compounds, or a mixture of two or more of them is treated with sulfuric acid and a nitrating agent, with or without the addition of other suitable materials: 1. Meta-nitro-anilin (crude or pure). 2. A compound derivable from meta-nitro-anilin by the substitution for hydrogen attached to the amino-nitrogen of one or more suitable acid radicals, such as —CO.Alkyl, —CO.Aryl, $SO_2$.Aryl or in ortho or para position to the same, such as —$SO_3H$, —COOH, or in several of these positions, or by combining the amino-nitrogen with an aldehydic radical, when again one or more suitable acid radicals may be in the ortho or para positions with regard to the aldehyde-substituted amino group. 3. Many of the above compounds, instead of being used in substance, may be used in the solution in which they have been prepared.

Examples of the compounds comprised under 2 are the following: 3.4-dinitro-anilin, 3.6-dinitro-anilin, 2.3-dinitro-anilin, 3-nitro-acet-anilid, 3.4-dinitro-acet-anilid, 3-nitro-para-tolyl-sulfonylanilid

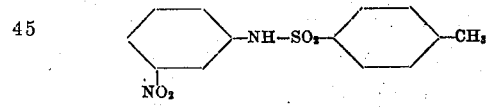

diacetyl-meta-nitro-anilid, benzoyl-meta-nitro-anilid, ortho-amino-para-nitrobenzoic acid, 3-nitro-4-sulfanilic acid, O-acetamino-para-nitrobenzoic acid, m-nitro-benzylidene-meta-nitro-anilin, meta-nitro-benzylidene-3.4-dinitro-anilin, etc.

Examples for (3) are a solution of 3.4-dinitro-acet-anilid in sulfuric acid, as it is obtained by the nitration of m-nitro-acetanilid; a solution of m-nitro-aniline in sulfuric acid, as it is obtained by the nitration of anilin; a solution of a mixture of 2.3-dinitro-acetanilid with 3.4- and 3.6-dinitro-acetanilids, as it is obtained by the nitration of meta-nitro-acetanilid in a mixture of nitric and sulfuric acids, etc.

The sulfuric acid used may according to the nature of the aromatic compound employed either only be fairly concentrated (for instance 60° Bé.), or concentrated (for instance 66° Bé.), or monohydrated, or fuming. The nitrating agent may be nitric acid, or its salts, or its ethers or its anhydrids (for instance sodium nitrate or acetyl-nitrate or ethyl-nitrate). The temperature of the reaction, the proportions of the ingredients, the mode of mixing them, the temperature at which they are mixed, and the mode of isolating the tetra-nitro-anilin, may be varied within wide limits.

The sulfuric acid may be used once only, or it may be used repeatedly, for nitrating new quantities of the above compounds; it is finally still suitable for many industrial purposes, such as the manufacture of nitric acid from nitrate.

Example I: 1 part of meta-nitro-anilin and 2½ parts of sodium nitrate are dissolved in about 36 to 40 parts of concentrated sulfuric acid; the mass is then heated to about 70° C. to 90° C. and if necessary external cooling is applied, to prevent the temperature from rising above 100° C. When the reaction has subsided, the mass is heated further to 100° C. for a few minutes, then allowed to cool, and the tetra-nitro-anilin isolated by filtration.

Example II: One part of meta-nitro-anilin is dissolved in 36 parts of strong sulfuric acid (either concentrated acid or monohydrate or fuming acid), 2½ parts of sodium-nitrate are then added, and the mass is allowed to remain at the ordinary temperature or at a lower or only slightly higher temperature for several days.

Example III: One part of meta-nitro-acetanilid is dissolved in 20 parts of strong sulfuric acid with 2 parts of sodium-nitrate (or an approximately equivalent amount of strong nitric acid) and either allowed to remain for some days at ordinary temperature, or it is heated, for instance to 100° C. The same sulfuric acid may be used again, as under II.

Example IV: 3.4-dinitro-anilin or 3.4-dinitro-acetanilid is treated as under III.

Example V: 2.3-dinitro-anilin or 2.3-dinitro-acetanilid is treated as under III.

Example VI: Ortho - amino - para - nitro-benzoic acid

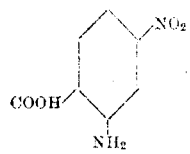

or meta-nitro-parasulphanilic acid

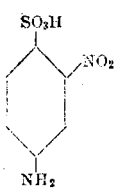

are converted into tetra - nitro - anilin by treating 1 part of any of these with two parts of sodium-nitrate in 20 parts of concentrated sulfuric acid, at 50 to 100° C.

Example VII: A solution of 3.4-dinitro-acetanilid, obtained for instance by treating 1 part of m-nitro-acetanilid with 1.15 parts of dry potassium-nitrate in 15 parts of sulfuric acid monohydrate, at the ordinary temperature for 24 hours is, after adding another 1.2 parts of potassium - nitrate, heated to 100° C.

Example VIII: 1 part of m-nitro-anilin, 2.5 parts of sodium-nitrate, and 35 parts of concentrated sulfuric acid are heated slowly to 65°. The temperature is then allowed to rise, without external heating or cooling. The precipitate is filtered after cooling.

Example IX. 20 parts of conc. sulfuric acid (or monohydrate or fuming acid) are heated to 70°. 1 part of m-nitro-anilin and 2.5 parts of sodium - nitrate may then be added gradually in different ways, they may for instance, be mixed and then added; or the whole of the nitrate may first be added, and the nitro-anilin gradually afterward, or the nitro-anilin may be dissolved first and the nitrate gradually added; or both compounds may be alternately added in portions.

Example X: 1 part of m-nitro-anilin, 1.3 parts of m-nitro-acet-anilid, 5 parts of sodium-nitrate, and 56 parts of sulfuric acid are gradually heated to 100° C.

Example XI: 1 part of m - nitro - benzylidene - m - nitro - anilin, together with 1.25 parts of sodium-nitrate and 20 parts of sulfuric acid are gradually heated to 100° C.

The tetra - nitro - anilin obtained as described, is a yellow crystalline product or powder having a specific gravity of about 1.8 and melting at about 210–212° C. with decomposition. It is easily soluble in acetone, less soluble in acetic acid, benzene and chloroform and almost insoluble in cold water. It can be re - crystallized, for instance from glacial acetic acid, or from nitro-benzene or xylene and is characterized by the remarkable facility with which its nitro group in the 3 position may be replaced by other groups. Thus the compound can in acetone solution, for instance, be quantitatively transformed into tri-nitro-meta-amino-phenol melting at 174 to 175° C., by treatment with an aqueous solution of sodium acetate at ordinary temperature. The nitro group in the 3-position can also be replaced by numerous other radicals, for instance by amins; the amino group can equally be replaced, though not so easily.

The chemical constitution may be indicated by the formula:

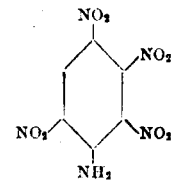

The new nitro compound may be used in the manufacture of explosives and dyes.

What I claim is:—

1. The process for manufacture of tetra - nitro - anilin, which consists in treating a meta nitro derivative of an aromatic amino compound with sulfuric acid and a nitrating agent, substantially as described.

2. The process for the manufacture of a tetra-nitro-anilin, which consists in treating meta-nitro-anilin with sulfuric acid and a nitrating agent, substantially as described.

3. As a new product, tetra -'nitro - anilin, being a yellow crystalline compound or a powder of the constitution

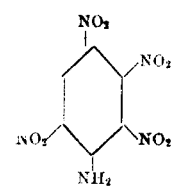

and about 1.8 specific gravity, melting at about 210° C. with decomposition, almost insoluble in cold water, easily soluble in acetone, less soluble in acetic acid, benzene and xylene, re-crystallizable from nitro-benzene, and distinguished by the facility, with which its nitro group in the 3-position may be replaced by other groups.

In testimony whereof I have signed my name to this specification in the presence of two subscribing witnesses.

BERNHARD JACQUES FLÜRSCHEIM.

Witnesses:
J. WETTER,
H. D. JAMESON.

Copies of this patent may be obtained for five cents each, by addressing the "Commissioner of Patents. Washington, D. C."